(12) United States Patent
Wang et al.

(10) Patent No.: US 12,058,250 B2
(45) Date of Patent: Aug. 6, 2024

(54) DYNAMIC WHITE BOX-BASED DATA PROCESSING METHOD, APPARATUS, AND DEVICE

(71) Applicant: Hangzhou Hikvision Digital Technology Co., Ltd., Hangzhou (CN)

(72) Inventors: Bin Wang, Hangzhou (CN); Si Chen, Hangzhou (CN); Guoyun Wang, Hangzhou (CN); Jiadong Chen, Hangzhou (CN); Da Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 584 days.

(21) Appl. No.: 17/437,220

(22) PCT Filed: Mar. 2, 2020

(86) PCT No.: PCT/CN2020/077478
§ 371 (c)(1),
(2) Date: Sep. 8, 2021

(87) PCT Pub. No.: WO2020/192366
PCT Pub. Date: Oct. 1, 2020

(65) Prior Publication Data
US 2022/0173898 A1 Jun. 2, 2022

(30) Foreign Application Priority Data
Mar. 28, 2019 (CN) .......................... 201910245733.4

(51) Int. Cl.
*H04L 9/08* (2006.01)

(52) U.S. Cl.
CPC ............ *H04L 9/0861* (2013.01); *H04L 9/085* (2013.01); *H04L 2209/043* (2013.01); *H04L 2209/16* (2013.01); *H04L 2209/34* (2013.01)

(58) Field of Classification Search
CPC . H04L 9/0861; H04L 9/085; H04L 2209/043; H04L 2209/16; H04L 2209/34
See application file for complete search history.

(56) References Cited

U.S. PATENT DOCUMENTS

| | | | |
|---|---|---|---|
| 2012/0170740 A1* | 7/2012 | Lee | ........................ H04L 9/0618 380/28 |
| 2017/0244677 A1* | 8/2017 | Lee | ........................ H04L 9/002 |

(Continued)

FOREIGN PATENT DOCUMENTS

| | | |
|---|---|---|
| CN | 104702492 | 6/2015 |
| CN | 105099666 | 11/2015 |

(Continued)

OTHER PUBLICATIONS

Kan; Zhigang, CN106411518A (English Translation), Feb. 15, 2017 (Year: 2017).*

(Continued)

*Primary Examiner* — Jung W Kim
*Assistant Examiner* — Alan Lingqian Kong
(74) *Attorney, Agent, or Firm* — NORTON ROSE FULBRIGHT US LLP

(57) ABSTRACT

Provided in the embodiments of the present application are a dynamic white box-based data processing method, apparatus, and device, the method comprising: using a pre-generated key obfuscation mapping relationship set to perform obfuscation processing on an original key to obtain a redundant key; and inputting the redundant key and to-be-processed data into a white box algorithm library to implement encryption and decryption processing; thus, in the (Continued)

technical solution provided in the embodiments of the present application, different redundant keys can be inputted into the white box algorithm library, so that there is no need to change the white box algorithm library and the key together, increasing the flexibility of the solution.

16 Claims, 2 Drawing Sheets

(56) References Cited

U.S. PATENT DOCUMENTS

2017/0346629 A1* 11/2017 Moon .................. H04L 9/30
2017/0352298 A1* 12/2017 Drexler ............ H04L 9/0822

FOREIGN PATENT DOCUMENTS

| CN | 106411518 | | 2/2017 | |
|----|-----------|---|--------|---|
| CN | 106411518 A | * | 2/2017 | ............ H04L 9/14 |
| CN | 106850603 | | 6/2017 | |
| CN | 107947917 | | 4/2018 | |
| CN | 109450632 | | 3/2019 | |
| CN | 110505054 | | 11/2019 | |

OTHER PUBLICATIONS

International Search Report and Written Opinion issued in Corresponding PCT Application No. PCT/CN2020/077478, dated May 27, 2020 (English Translation provided).

* cited by examiner

DYNAMIC WHITE BOX-BASED DATA PROCESSING METHOD, APPARATUS, AND DEVICE

CROSS REFERENCE TO RELATED APPLICATIONS

The present application is a national phase application under 35 U.S.C. § 371 of International Application No. PCT/CN2020/077478, filed Mar. 2, 2020, which claims the benefit of priority to Chinese Patent Application No. 201910245733.4, filed with the China National Intellectual Property Administration on Mar. 28, 2019 and entitled "DYNAMIC WHITE BOX-BASED DATA PROCESSING METHOD, APPARATUS, AND DEVICE", each of which are incorporated herein by reference in their entirety.

TECHNICAL FIELD

The present application relates to information security technology, and in particular relates to a dynamic white box-based data processing method, an apparatus, and a device.

BACKGROUND

White box cryptography is a cryptography technology that can resist white box attacks. A white box attack means that the attacker has complete control over the device terminal and can observe and change the internal data of the program when it is running. At present, white-box cryptography technology is mainly implemented with a one-library-one-encryption solution, that is, a fixed key is encapsulated in a white box algorithm library. If the key in the white box algorithm library is to be changed, the white box algorithm library has to be changed accordingly. As a result, data encryption and decryption using white box cryptography is inflexible.

SUMMARY

Embodiments of the present application provide a dynamic white box-based data processing method, an apparatus, and a device to improve the flexibility of data encryption and decryption.

In this regard, an embodiment of the present application provides a dynamic white box-based data processing method, including:
  obtaining to-be-processed data and a redundant key; wherein, the to-be-processed data is to-be-encrypted data or to-be-decrypted data; the redundant key is obtained by mapping an original key using a pre-generated key obfuscation mapping relationship set;
  inputting the to-be-processed data and the redundant key into a white box algorithm library, and mapping the to-be-processed data using an encoding mapping relationship set in the white box algorithm library to obtain target encoded data; and
  mapping the target encoded data and the redundant key using a transformation mapping relationship set in the white box algorithm library to obtain processed data; wherein, if the to-be-processed data is to-be-encrypted data, then the processed data is encrypted data, and if the to-be-processed data is to-be-decrypted data, then the processed data is decrypted data.

Optionally, the key obfuscation mapping relationship set comprises at least one key obfuscation mapping relationship, which is generated by:
  for each obtained first-type key, dividing the first-type key into a first part key and a second part key; calling a cryptology obfuscation algorithm for obfuscating the first part key to obtain first transformed data and obfuscating the second part key to obtain second transformed data; splicing the first transformed data and the second transformed data to obtain a second-type key; and generating a mapping relationship between the first-type key and the second-type key as the key obfuscation mapping relationship.

Optionally, the encoding mapping relationship set comprises at least one encoding mapping relationship, and the transformation mapping relationship set comprises at least one transformation mapping relationship; before inputting the to-be-processed data and the redundant key into a white box algorithm library, the method further comprises:
  encoding each obtained first-type data using an encoding mapping algorithm to obtain encoded data; and generating a mapping relationship between the first-type data and the encoded data as the encoding mapping relationship;
  transforming each obtained second-type data and each second-type key using encryption and decryption transformation algorithm to obtain transformed data; generating a mapping relationship between the second-type data together with the second-type key and the transformed data as the transformation mapping relationship; and
  obtaining the white box algorithm library comprising the encoding mapping relationship set and the transformation mapping relationship set.

Optionally, encoding the first-type data using the encoding mapping algorithm to obtain encoded data comprises:
  dividing the first-type data into first part data and second part data;
  encoding the first part data using the encoding mapping algorithm to obtain first encoded data and encoding the second part data using the encoding mapping algorithm to obtain second encoded data; and
  splicing the first encoded data and the second encoded data to obtain encoded data for the first-type data.

Optionally, transforming each obtained second-type data and each second-type key using encryption and decryption transformation algorithm to obtain transformed data; generating a mapping relationship between the second-type data together with the second-type key and the transformed data as the transformation mapping relationship comprises:
  inversely encoding the second-type data to obtain inverse encoded data; inversely obfuscating the second-type key to obtain an inverse obfuscated key; performing inverse transformation of row transformation on the inverse encoded data and the inverse obfuscated key to obtain first-type transformed data; and generating a mapping between the second-type data together with the second-type key and the first-type transformed data as a first-type transformation mapping relationship;
  performing row transformation on the second-type data to obtain row transformed data; performing a first-type S-box transformation on the row transformed data to obtain first-type S-box transformed data; performing column transformation on the first-type S-box transformed data to obtain second-type transformed data; and generating a mapping relationship between the second-type data and the second-type transformed data as a second-type transformation mapping relationship;

performing a second-type S-box transformation on the second-type data to obtain second-type S-box transformed data; generating a mapping relationship between the second-type data and the second-type S-box transformed data as a third type transformation mapping relationship; and performing a key transformation on the second-type data and the second-type key to obtain third transformed data; determining a mapping relationship between the second-type data together with the second-type key and the third type transformed data as a fourth type transformation mapping.

Optionally, the transformation mapping relationship set comprises a first-type transformation mapping relationship set, a second-type transformation mapping relationship set, a third type transformation mapping relationship set, and a fourth type transformation mapping relationship set, wherein, the first-type transformation mapping relationship set comprises at least one first-type transformation mapping relationship, the second-type transformation mapping relationship set comprises at least one second-type transformation mapping relationship, the third type transformation mapping relationship set comprises at least one third type transformation mapping relationship, and the fourth type transformation mapping relationship set comprises at least one fourth type transformation mapping relationship;

mapping the target encoded data and the redundant key using the transformation mapping relationship set in the white box algorithm library to obtain processed data comprises:

mapping the target encoded data and the redundant key using the first-type transformation mapping relationship set to obtain the first-type mapping data;

mapping the first-type mapping data using the second-type transformation mapping relationship set to obtain the second mapping data;

mapping the second-type mapping data using the third type transformation mapping relationship set to obtain the third type mapping data; and mapping the third type mapping data using the fourth type transformation mapping relationship set to obtain processed data.

Optionally, mapping the first-type mapping data using the second-type transformation mapping relationship set to obtain the second mapping data comprises:

mapping the first-type mapping data using the second-type transformation mapping relationship set to obtain intermediate data;

determining whether a preset cycle number is reached;

if the preset cycle number is not reached, then returning the second-type mapping data to the step of mapping the encoded data and the redundant key using the first-type transformation mapping relationship set to obtain the first-type mapping data, until the preset cycle number is reached; and if the preset cycle number is reached, then the intermediate data is determined as the second-type mapping data.

Optionally, transforming the second-type data and the second-type key using encryption and decryption transformation algorithm to obtain transformed data comprises:

performing one or more of following transformations on the second-type data and the second-type key using the encryption and decryption transformation algorithm to obtain the transformed data: row transformation, S-box transformation, and column transformation.

To achieve the above object, an embodiment of the present application further provides a dynamic white box-based data processing apparatus, including:

an obtaining module configured for obtaining to-be-processed data and a redundant key; wherein, the to-be-processed data is to-be-encrypted data or to-be-decrypted data; the redundant key is obtained by mapping an original key using a pre-generated key obfuscation mapping relationship set;

an input module configured for inputting the to-be-processed data and the redundant key into a white box algorithm library;

a first mapping module configured for mapping the to-be-processed data using an encoding mapping relationship set in the white box algorithm library to obtain target encoded data; and a second mapping module configured for mapping the target encoded data and the redundant key using a transformation mapping relationship set in the white box algorithm library to obtain processed data; wherein, if the to-be-processed data is to-be-encrypted data, then the processed data is encrypted data, and if the to-be-processed data is to-be-decrypted data, then the processed data is decrypted data.

Optionally, the key obfuscation mapping relationship set comprises at least one key obfuscation mapping relationship; the apparatus further comprises:

a first generating module configured for: for each obtained first-type key, dividing the first-type key into a first part key and a second part key; calling a cryptology obfuscation algorithm for obfuscating the first part key to obtain first transformed data and obfuscating the second part key to obtain second transformed data; splicing the first transformed data and the second transformed data to obtain a second-type key; and generating a mapping relationship between the first-type key and the second-type key as the key obfuscation mapping relationship.

Optionally, the encoding mapping relationship set comprises at least one encoding mapping relationship, and the transformation mapping relationship set comprises at least one transformation mapping relationship; the apparatus further comprises: a second generating module and a third generating module, wherein, the second generating module is configured for encoding each obtained first-type data using an encoding mapping algorithm to obtain encoded data; and generating a mapping relationship between the first-type data and the encoded data as the encoding mapping relationship; and the third generating module is configured for transforming each obtained second-type data and each second-type key using encryption and decryption transformation algorithm to obtain transformed data; generating a mapping relationship between the second-type data together with the second-type key and the transformed data as the transformation mapping relationship, and obtaining the white box algorithm library comprising the encoding mapping relationship set and the transformation mapping relationship set.

Optionally, the second generating module is further configured for:

dividing the first-type data into first part data and second part data;

encoding the first part data using the encoding mapping algorithm to obtain first encoded data and encoding the second part data using the encoding mapping algorithm to obtain second encoded data; and splicing the first encoded data and the second encoded data to obtain encoded data for the first-type data.

Optionally, the third generating module is further configured for:

inversely encoding the second-type data to obtain inverse encoded data; inversely obfuscating the second-type key to obtain an inverse obfuscated key; performing inverse transformation of row transformation on the inverse encoded data and the inverse obfuscated key to obtain first-type transformed data; and generating a mapping between the second-type data together with the second-type key and the first-type transformed data as a first-type transformation mapping relationship;

performing row transformation on the second-type data to obtain row transformed data; performing a first-type S-box transformation on the row transformed data to obtain first-type S-box transformed data; performing column transformation on the first-type S-box transformed data to obtain second-type transformed data; and generating a mapping relationship between the second-type data and the second-type transformed data as a second-type transformation mapping relationship;

performing a second-type S-box transformation on the second-type data to obtain second-type S-box transformed data; generating a mapping relationship between the second-type data and the second-type S-box transformed data as a third type transformation mapping relationship; and performing a key transformation on the second-type data and the second-type key to obtain third transformed data; determining a mapping relationship between the second-type data together with the second-type key and the third type transformed data as a fourth type transformation mapping.

Optionally, the transformation mapping relationship set comprises a first-type transformation mapping relationship set, a second-type transformation mapping relationship set, a third type transformation mapping relationship set, and a fourth type transformation mapping relationship set, wherein, the first-type transformation mapping relationship set comprises at least one first-type transformation mapping relationship, the second-type transformation mapping relationship set comprises at least one second-type transformation mapping relationship, the third type transformation mapping relationship set comprises at least one third type transformation mapping relationship, and the fourth type transformation mapping relationship set comprises at least one fourth type transformation mapping relationship; and the second mapping module is further configured for:

mapping the target encoded data and the redundant key using the first-type transformation mapping relationship set to obtain the first-type mapping data;

mapping the first-type mapping data using the second-type transformation mapping relationship set to obtain the second mapping data;

mapping the second-type mapping data using the third type transformation mapping relationship set to obtain the third type mapping data; and mapping the third type mapping data using the fourth type transformation mapping relationship set to obtain processed data.

Optionally, the second mapping module is further configured for:

mapping the first-type mapping data using the second-type transformation mapping relationship set to obtain intermediate data;

determining whether a preset cycle number is reached;

if the preset cycle number is not reached, then returning the second-type mapping data to the step of mapping the encoded data and the redundant key using the first-type transformation mapping relationship set to obtain the first-type mapping data, until the preset cycle number is reached; and if the preset cycle number is reached, then the intermediate data is determined as the second-type mapping data.

Optionally, the third generating module is further configured for:

performing one or more of following transformations on the second-type data and the second-type key using the encryption and decryption transformation algorithm to obtain the transformed data: row transformation, S-box transformation, and column transformation.

To achieve the above object, an embodiment of the present application further provides an electronic device, which comprises a processor and a memory:

the memory is configured for storing a computer programs the processor is configured for, upon executing the programs stored on the memory, cause the implementation of any one of the dynamic white box-based data processing methods.

To achieve the above object, an embodiment of the present application further provides a computer-readable storage medium, wherein, the computer-readable storage medium stores a computer program, that upon executed by a processor, cause the implementation of any one of the dynamic white box-based data processing methods.

To achieve the above object, an embodiment of the present application further provides a computer program, that upon executed by a processor, cause the implementation of any one of the dynamic white box-based data processing methods.

By applying the embodiment of the present application, the pre-generated key obfuscation mapping relationship set is used for obfuscating the original key to obtain the redundant key, the redundant key and to-be-processed data are input into the white box algorithm library to be encrypted and decrypted. It can be seen, in the technical solution in the embodiment of the present application, when white box cryptography is used to encrypt and decrypt data, if a key in the white box algorithm library is to be changed, different redundant keys can be inputted into the white box algorithm library, i.e., changing the redundant keys inputted into the white box algorithm library without changing the white box algorithm library with the key. The flexibility of the solution for encrypting data is improved.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those of ordinary skill in the art without creative work shall fall within the protection scope of this application.

To solve the technical problem above, an embodiment of the present application provides a dynamic white box-based data processing method, apparatus and a device, the method and the apparatus may be applied to electronic devices such as mobile phones, tablets, and computers, which is not limited herein. The dynamic white box-based data processing method according to the embodiment of the present application is introduced in detail.

Figure 1:
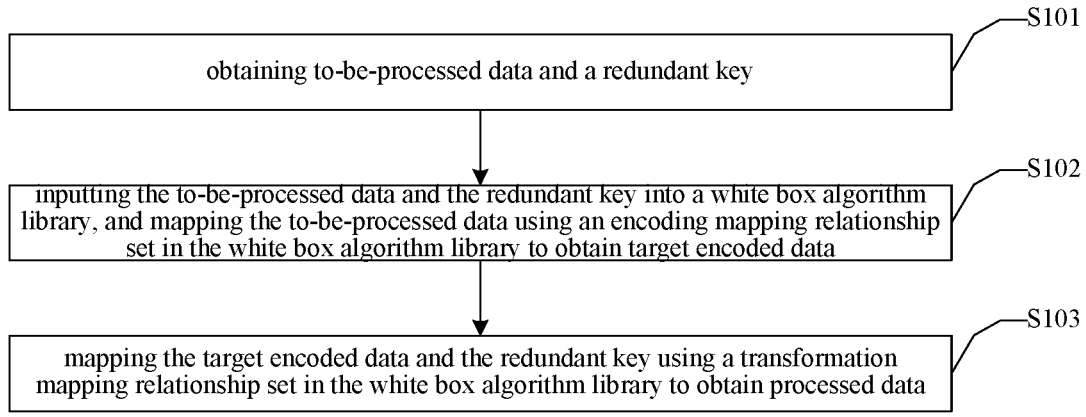
FIG. 1 is a schematic flowchart of a dynamic white box-based data processing method according to an embodiment of the present application.

FIG. 1 is a schematic flowchart of a dynamic white box-based data processing method according to an embodiment of the present application, including the following steps.

At step S101, to-be-processed data and a redundant key are obtained.

To-be-processed data is to-be-encrypted data or to-be-decrypted data. The redundant key is obtained by mapping an original key using a pre-generated key obfuscation mapping relationship set. The pre-generated key obfuscation mapping relationship set includes at least one key obfuscation mapping relationship between the original key and redundant key.

In embodiments of the present application, data may be encrypted or decrypted, and encryption process and decryption process are similar. For ease of description, to-be-encrypted data and to-be-decrypted data are collectively referred to as to-be-processed data.

In the embodiment of the present application, the original key may be obtained in advance. The original key may be a real key set by a user, or a key transformed from the real key set by a user. Then, a redundant key is obtained by mapping the original key through a pre-generated key obfuscation mapping relationship.

The embodiment of the present application may be applied in white box cryptography. In the technical solution according to the embodiment of the present application, sample data may be acquired in advance, data operation process is performed on the sample data to generate a mapping relationship between the sample data and operation results. Mapping relationships between one or more operation results and sample data form the mapping relationship map set. When the to-be-processed data is encrypted and decrypted subsequently, the to-be-processed data is obtained by using the mapping relationship set is used to map the to-be-processed data to obtain an operation result. In the white box cryptography, attackers may observe a data operation process. In the embodiment, however, when data is encrypted and decrypted, only a mapping process is performed based on a key obfuscation mapping relationship set without performing a specific data operation process. Therefore, in the embodiment of the present application, attackers cannot observe the specific data operation process and only can observe the mapping process. In this way, security of data encryption and decryption is improved.

By way of example, the mapping relationship set in the embodiment of the present application may be stored in the form of a table. When data is encrypted and decrypted by applying the technical solution in the embodiment of the present application, attackers can only observe a table looking up process. For example, a pre-generated key obfuscation mapping relationship set may be stored as a mapping table recording a plurality of mapping relationships between original key and redundant key.

In an embodiment, a process of generating a key obfuscation mapping relationship set includes: obtaining sample data, obfuscating the sample data to obtain obfuscation data, and generating a mapping relationship between the sample data and the obfuscation data. One or more pieces of sample data and the obfuscation data form a mapping relationship set. The sample data may be considered as an original key, the obfuscation data may be considered as a redundant key. The relationship between a plurality of sample data and the obfuscation data forms the key obfuscation mapping relationship set. Therefore, the original key can be mapped to the redundant key through the key obfuscation mapping relationship set.

A key obfuscation mapping relationship set includes at least one key obfuscation mapping relationship, each of which is generated in a similar manner. In another embodiment, a key obfuscation mapping relationship may be generated based on the following process:

for each obtained first-type key, dividing the first-type key into a first part key and a second part key; calling a cryptology obfuscation algorithm for obfuscating the first part key to obtain first transformed data and obfuscating the second part key to obtain second transformed data; splicing the first transformed data and the second transformed data to obtain a second-type key; and generating a mapping relationship between the first-type key and the second-type key as the key obfuscation mapping relationship.

In the embodiment of the present application, for ease of description, the sample data obtained is referred to as the first-type key and the obfuscation data obtained by obfuscating the first-type key is referred to as the second-type key.

In the embodiment, a complete first-type key is formed by a first part key and a second party key form. The first-type key is divided into two parts, and the two parts are separately obfuscated. In this way, each part key after the obfuscation has a smaller data amount than the data amount of the first-type key. This reduces the computation burden of obfuscating each part key, and improves computation efficiency of the obfuscation. Further, a cryptology obfuscation algorithm is called to obfuscate part keys with a smaller data amount (the first part key and the second part key), reducing the computation burden and reducing storage space occupied in the memory, which enables the technical solution according to the embodiment of the present application adapt to embedded devices, devices with small storage space, and/or IoT devices.

It is assumed that the first-type key is a character string. In one case, the first part key may be the left part of the character string and the second part key may be the right part of the character string. Alternatively, in another case, the first part key may include odd bits of the character string (the 1st, 3rd, 5th . . . bits of the character string), and characters in the odd bits are ordered based on their positions to obtain the first part key; and the second part key may include even bits of the character string (the 2nd, 4th, 6th . . . bits of the character string), and characters in the even bits are ordered based on the positions to obtain the second part key. Alternatively, in a further case, the first-type key may be divided into two parts base on other rules. Embodiments are not limited in this aspect.

By way of example, a cryptology obfuscation algorithm may be a linear or non-linear obfuscation algorithm, such as a multiplication operation, a permutation operation, which is not specifically limited herein.

At step S102, the to-be-processed data and the redundant key are input into a white box algorithm library, and an encoding mapping relationship set in the white box algorithm library is used to map the to-be-processed data to obtain target encoded data.

As described above, when data is encrypted and decrypted in the embodiment of the present application, a specific data operation process is not performed. Instead, the data is mapped to obtain an operation result through a pre-generated mapping relationship set, which is equivalent to an operation process on the data. The white box algorithm library in the embodiment of the present application stores various pre-generated mapping relationship sets, e.g., the encoding mapping relationship set described in step S102.

By way of example, the encoding mapping relationship set includes at least one encoding mapping relationship. A process of generating the encoding mapping relationship may include: encoding each obtained first-type data using an encoding mapping algorithm to obtain encoded data; and generating a mapping relationship between the first-type data and the encoded data as the encoding mapping relationship.

The first-type data may be considered as the sample data. In the embodiment, sample data for generating various mapping relationships sets may be the same or different.

Since the encoding mapping relationship set includes a mapping relationship between sample data (the first-type data) and encoded data, when to-be-processed data in step S101 is mapped using the encoding mapping relationship set, the encoded data corresponding to the to-be-processed data can be obtained. For ease of description, the encoded data obtained through mapping is referred to as target encoded data.

In one embodiment, encoding the first-type data using the encoding mapping algorithm to obtain encoded data comprises: dividing the first-type data into first part data and second part data; encoding the first part data using the encoding mapping algorithm to obtain first encoded data and encoding the second part data using the encoding mapping algorithm to obtain second encoded data; and splicing the first encoded data and the second encoded data to obtain encoded data for the first-type data.

In the embodiment, the first-type data are divided into two parts and separately encoded. in this way, each part data encoded has a smaller data amount than the data amount of the first-type data Computation efficiency of encoding is improved. Further, the encoding mapping algorithm is used to process the part data (the first part data and the second part data) with smaller data amount, reducing computation burden and reducing storage space occupied in the memory, which enables the technical solution according to the embodiment of the present application adapt to embedded devices, devices with small storage space, and/or IoT devices.

It is assumed that the first-type data is a character string. In one case, the first part data may be the left part of the character string and the second part data may be the right part of the character string; alternatively, in another case, the first part data may include odd bits of the character string (the 1st, 3rd, 5th . . . bits of the character string), and characters in the odd bits are ordered based on their positions to obtain the first part data; while the second part data may include even bits of the character string (the 2nd, 4th, 6th . . . bits of the character string), and characters in the even bits are ordered based on their positions to obtain the second part data. Alternatively, in a further case, the first-type data may be divided into two parts base on other rules. The specific division rules are not limited herein.

By way of example, a cryptology obfuscation algorithm may be a linear or non-linear obfuscation algorithm, such as a multiplication operation, a permutation operation, which is not specifically limited herein.

In one case, the encoding mapping relationship set may be stored in the form of table, e.g., the encoding mapping relationship set may be stored in the form of an input encoding table. In this case, step S102 may be considered as a process of looking up in the input encoding table. For ease of description, the encoded data to be looked up for in the input encoding table is referred to target encoded data.

At step S103, a transformation mapping relationship set in the white box algorithm library is used to map the target encoded data and the redundant key to obtain processed data.

If to-be-processed data is to-be-decrypted data, then the processed data is decrypted data; and if to-be-processed data is to-be-decrypted data, then the processed data is decrypted data.

As described above, the white box algorithm library in the embodiment of the present application stores various pre-generated mapping relationship sets, including the transformation mapping relationship set described in step S103. The process of generating the white box algorithm library may be considered as a process of generating the encoding mapping relationship set and the transformation mapping relationship set.

The transformation mapping relationship set includes at least one transformation mapping relationship. By way of example, the process of generating the transformation mapping relationship may include: transforming each obtained to-be-transformed second-type data using encryption and decryption transformation algorithm to obtain transformed data; generating a mapping relationship between the to-be-transformed data and the transformed data as the transformation mapping relationship. The to-be-transformed data includes the second-type data and each second-type key. The second-type data may be considered as the sample data.

In one case, to-be-transformed data may be divided into two parts separately. In this way, each part data to be transformed has a smaller data amount than that of the to-be-transformed data. The computation efficiency of transformation is improved, computation burden and storage space occupied in the memory are reduced. This enables the technical solution according to the embodiment of the present application adapt to embedded devices, devices with small storage space, and/or IoT devices. As described above (in which the first-type data and the first-type key are divided into two parts separately). Two manners may be used to divide the to-be-transformed data into two parts, such as left part and right part, or odd bits and even bits, which is not repeated herein.

In one case, transforming to-be-transformed data using encryption and decryption transformation algorithm to obtain transformed data, i.e., transforming the second-type data and the second-type key using the encryption and decryption transformation algorithm to obtain transformed data may include: performing one or more of following transformations on the second-type data and the second-type key using the encryption and decryption transformation algorithm to obtain the transformed data: row transformation, S-box transformation, and column transformation.

As an implementation, the transformation mapping relationship may include multiple types of mapping relationships, e.g., four types of transformation mapping relationships. The second-type data and the second-type key are taken as examples below to introduce processes of generating the four types of transformation relationships.

The second-type data is inversely encoded to obtain inverse encoded data; the second-type key is inversely obfuscated to obtain an inverse obfuscated key; inverse transformation of row transformation is performed on the inverse encoded data and inverse obfuscated key to obtain first-type transformed data; and a mapping relationship between the second-type data together with the second-type key and the first-type transformed data is generated as a first-type transformation mapping relationship.

Row transformation is performed on the second-type data to obtain row transformed data; a first-type S-box transformation is performed on the row transformed data to obtain first-type S-box transformed data; column transformation is performed on the first-type S-box transformed data to obtain second-type transformed data; and a mapping relationship between the second-type data and the second-type transformed data is generated as a second-type transformation mapping relationship.

A second-type S-box transformation is performed on the second-type data to obtain second-type S-box transformed data; a mapping relationship between the second-type data and the second-type S-box transformed data is generated as a third type transformation mapping relationship.

A key transformation is performed on the second-type data and the second-type key to obtain third transformed data; a mapping relationship from the second-type data together with the second-type key and the third type transformed data is generated as a fourth type transformation mapping relationship.

In the implementation, the transformation mapping relationship sets include a first-type transformation mapping relationship set, a second-type transformation mapping relationship set, a third type transformation mapping relationship set, and a fourth type transformation mapping relationship set, wherein, the first-type transformation mapping relationship set includes at least one first-type transformation mapping relationship, the second-type transformation relationship set includes at least one second-type transformation mapping relationship, the third type transformation relationship set includes at least one third type transformation mapping relationship, and the fourth type transformation relationship set includes at least one fourth type transformation mapping relationship.

For example, the transformation mapping relationship sets may be stored in the form of a table. For example, the first transformation mapping relationship set can be stored as a key encryption table, the second transformation mapping relationship set can be stored as a column obfuscation table and a column obfuscation auxiliary table, the third transformation mapping relationship set can be stored as a S-box transformation table, and the fourth transformation mapping relationship set can be stored as a key encryption transformation table.

In the implementation, the white box algorithm library may include the encoding mapping relationship set and the four types of transformation mapping relationship sets; these mapping relationship sets are generated, i.e., the white box algorithm library is generated. As described in above examples, the white box algorithm library may include six tables, i.e., the input encoding table, the key encryption table, the column obfuscation table, the column obfuscation auxiliary table, S-box transformation table, and the key encryption transformation table.

In one case, step S103 may include: mapping the target encoded data and the redundant key using the first-type transformation mapping relationship set to obtain the first-type mapping data; mapping the first-type mapping data using the second-type transformation mapping relationship set to obtain the second mapping data; mapping the second-type mapping data using the third type transformation mapping relationship set to obtain the third type mapping data; and mapping the third type mapping data using the fourth type transformation mapping relationship set to obtain processed data.

Figure 2:
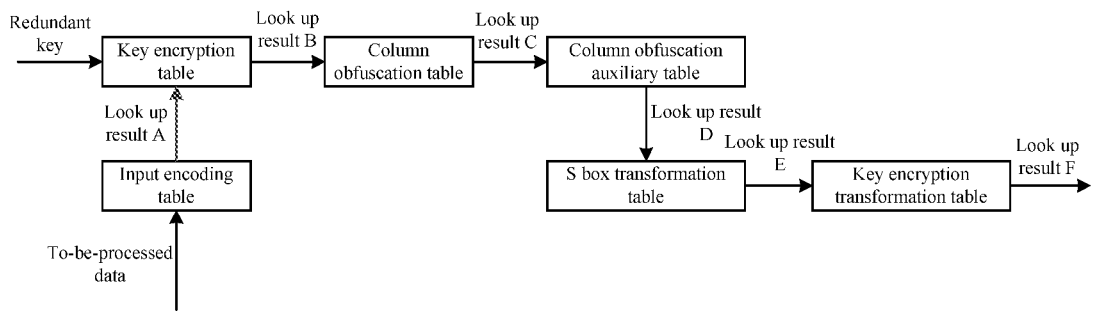
FIG. 2 is a schematic diagram of looking up in a table according to an embodiment of the present application.

By way of example, after to-be-processed data and the redundant key are acquired at step S101, the to-be-processed data and the redundant key are input the white box algorithm library. Referring to FIG. 2, the input encoding table is looked up based on the to-be-processed data to obtain a look up result A; the key encryption table is looked up based on the look up result A and the redundant key to obtain a look up result B; the column obfuscation table is looked up based on the look up result B to obtain a look up result C; the column obfuscation auxiliary table is looked up based on the look up result C to obtain a look up result D; the S-box transformation table is looked up based on the look up result D to obtain a look up result E; and the key encryption transformation table is looked up base on the look up result E to obtain a look up result F. The look up result F is the processed data (If the to-be-processed data is to-be-encrypted data, then the processed data is encrypted data; and if the to-be-processed data is to-be-decrypted data, then the processed data is decrypted data).

In another implementation, mapping the first-type mapping data using the second-type transformation mapping relationship set to obtain the second-type mapping data may include: mapping the first-type mapping data using the second-type transformation mapping relationship set to obtain intermediate data; determining whether a preset cycle number is reached; if the preset cycle number is not reached, then returning the second-type mapping data to the step of mapping the encoded data and the redundant key using the first-type transformation mapping relationship set to obtain the first-type mapping data, until the preset cycle number is reached; and if the preset cycle number is reached, then the intermediate data is determined as the second-type mapping data.

Figure 3:
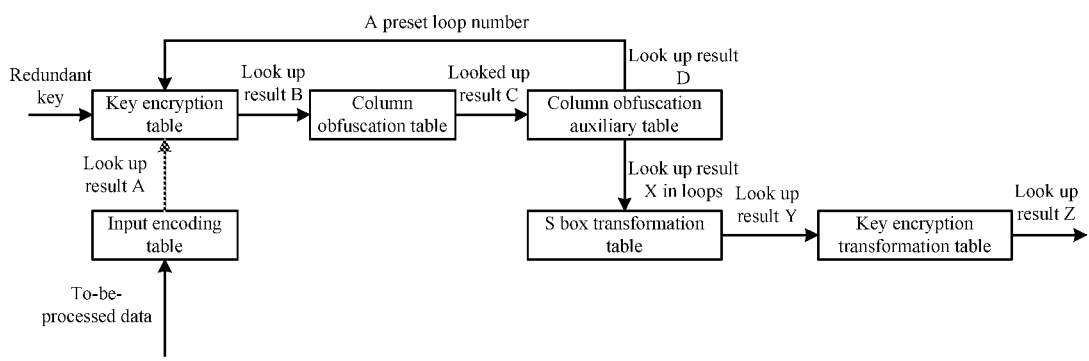
FIG. 3 is a schematic diagram of looking up in another table according to an embodiment of the present application.

By way of example, referring to FIG. 3, the input encoding table is first looked up based on to-be-processed data to obtain a look up result A; the key encryption table is looked up based on the look up result A and the redundant key to obtain a look up result B; the column obfuscation table is looked up based on the look up result B to obtain a look up result C; the column obfuscation auxiliary table is looked up based on the look up result C to obtain the look up result D; and the flow proceeds back to looking up the key encryption table based on the look up result D and the redundant key, i.e., the flow is circulated to reach a preset cycle number to obtain a cycle look up result X; and then, the S-box transformation table is looked up based on the cycle look up result X to obtain a look up result Y; and the key encryption transformation table is looked up based on the look up result Y to finally obtain a final look up result Z, i.e., the processed data.

With the embodiment of the present application, in a first aspect, different redundant keys may be input into a white box algorithm library, i.e., the white box algorithm library and the key do not need to be changed together, which improves the flexibility of the solution. In a second aspect, data may be divided into different parts to be processed separately. In this way, the computation efficiency is improved, and the algorithm is called for processing the data with smaller data amount, which reduces the computation burden. Further, in a third aspect, the white algorithm library in the embodiment only stores mapping relationship sets without performing specific data operations. The security of the solution is improved and memory occupation in the white algorithm library is reduced. Furthermore, in a fourth aspect, corresponding to division of data into different parts to be processed separately, input and output data in the mapping relationship sets stored in the white algorithm library are also divided. As such, data amount in the mapping relationship sets is reduced and memory occupation in the white algorithm library is further reduced.

A specific implementation is introduced as below.

1. A redundant key generation tool and a white box algorithm library are generated.

The redundant key generation tool may include the key obfuscation table. Generating the redundant key generation tool may be considered as generating the key obfuscation table. The key obfuscation table is the key obfuscation mapping relationship set.

By way of example, sample data may be acquired in the following manner: a cryptology obfuscation algorithm is called to introduce a linear obfuscation operation, a non-linear obfuscation operation, and a random factor to obfuscate sample data to obtain an obfuscated result. The mapping relationship between the sample data and the obfuscated result is stored in an key obfuscation table.

During obfuscating the sample data, each sample data may be divided into two parts to be obfuscated separately, and the two part data obfuscated are spliced to obtain an obfuscated result. This can improve the computation efficiency and reduce computation burden since the algorithm is called for processing data with smaller data account.

The white algorithm library includes six tables i.e., an input encoding table, a key encryption table, a column obfuscation table, a column obfuscation auxiliary table, S-box transformation table, and a key encryption transformation table.

The process of generating the input encoding table may include: acquiring sample data; encoding the sample data using an encoding mapping algorithm to obtain an encoded result; and storing a relationship between the sample data and encoded result into the input encoding table.

During the process of encoding sample data, each sample data may be divided into two parts to be encoded separately, and the encoded two part data are spliced to obtain the encoded result. This can improve the computation efficiency and reduce computation burden since the algorithm is called for processing data with a smaller data amount.

The process of generating the key encryption table may include: acquiring sample data; inversely encoding the sample data to obtain inverse encoded data; inversely obfuscating the sample data to obtain an inverse obfuscated key; performing inverse transformation of row transformation on the inverse encoded data and the inverse obfuscated key to obtain first-type transformed data; and storing the relationship between the sample data and the first-type transformed data in the key encryption table.

The process of generating the column obfuscation table may include: obtaining sample data, performing row transformation on the sample data to obtain row transformed data, performing a first-type S-box transformation on the row transformed data to obtain first-type S-box transformed data, and storing the first-type S-box transformed data into the column obfuscation table.

During the process of the first-type S-box transformation is performed on the row transformed data, each row transformed data may be divided into two parts to be performed the first-type S-box transformation separately, and then the first-type S-box transformed two parts data are spliced to obtain the first-type S-box transformed data. This improves the computation efficiency, and reduce the computation burden since an algorithm is called for processing data with a smaller data amount.

The process of generating the column obfuscation auxiliary table may include: acquiring sample data, column transforming the sample data to obtain column transformed data; storing the mapping relationship between the sample table and column transformed data into the column obfuscation auxiliary table.

The process of generating the S-box transformation table may include: acquiring sample data, performing the second-type S-box transformation on the sample table to obtain the second-type S-box transformed data; storing the mapping relationship between the sample data and the second-type S-box transformed data in the S-box transformation table.

During the process of performing the second-type S-box transformation on the sample data, each sample data may be divided into two parts to be performed the second-type S-box transformation separately, and then the second-type S-box transformed two parts data are spliced to obtain the second-type S-box transformed data. This improves the computation efficiency, and reduce the computation burden since an algorithm is called for processing data with a smaller data amount.

The process of generating the key encryption transformation table may include: acquiring sample table; performing key transformation on the sample data to obtain the third transformed data; storing the mapping relationship between the sample data and the third transformed data in the key encryption transformation table.

During the process of performing key transformation on the sample data, each sample data may be divided into two parts to be performed key transformation separately, and then the key transformation performed two parts data are spliced to obtain the third transformed data. This improves the computation efficiency, and reduce the computation burden since an algorithm is called for processing data with a smaller data amount.

Dividing data into two parts are described in a couple of places in the content above. As described above, data may be divided into left part and right part; alternatively, data may be divided into odd bits and even bits; and alternatively, data may be divided into two parts based on other division rules, which is not limited herein.

By way of example, tables for encryption process and tables for decryption process may be different. In one case, encryption process and decryption process may use the same algorithm or similar algorithms but specific parameters in the algorithm may be different. In this case, the above solution may be used to generate two sets of tables separately, and each set of tables include the six tables above, i.e., the input encoding table, the key encryption table, the column obfuscation table, the column obfuscation auxiliary table, S-box transformation table, and the key encryption transformation table.

In one case, sample data used for generating the tables above may be the same or different; if the sample data used for generating the tables above is the same, the sample data may be acquired once, and the acquired sample data is used for generating the tables above. By way of example, size of the sample data may be related to size of input data for the tables, e.g., it is assumed that the size of input data for the tables is 8 bits, then the sample data used for generating the tables may be 0-255. The embodiment of the present application will not limit the input data for the tables and the sample data used for generating the tables.

2. The redundant key is generated.

A real key set by a user is acquired, Advanced Encryption Standard (AES) key expansion algorithm is called for generating a round key, a mapped value for the round key is looked up for in the generated key obfuscation table and taken as the generated redundant key.

3. The white box algorithm library is called for encrypting and decrypting data.

Referring to FIG. 3, a mapped value for the to-be-processed data (to-be-encrypted data or to-be-decrypted data) is looked up for in the generated input encoding table and taken as a look up result A; the key encryption table is looked up based on the look up result A and the obtained redundant key to obtain a look up result B; the obfuscation table is looked up based on the look up result B to obtain a look up result C; the column obfuscation auxiliary table is looked up based on the look up result C to obtain a look up result D. The process then proceed back to looking up in the key encryption table, i.e., the flow is circulated until a preset cycle number is reached to obtain a cycle look up result X; and then the S-box transformation table is looked up based on the cycle look up result X to obtain a look up result Y; and the key encryption transformation table is looked up based on the look up result Y to finally obtain a look up result Z, i.e., the processed data.

If the to-be-processed data is to-be-encrypted data, then the processed data is encrypted data; and if to-be-processed data is to-be-decrypted data, then processed data is decrypted data.

Figure 4:
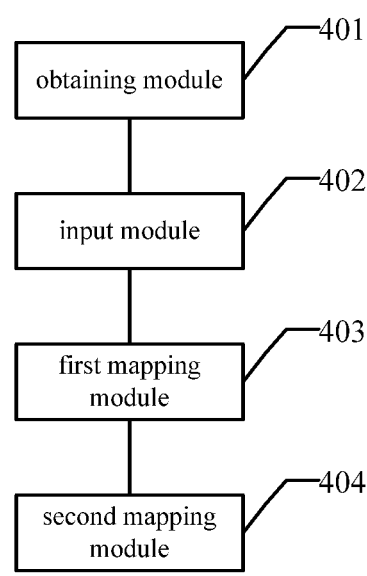
FIG. 4 is a schematic structural diagram of a dynamic white box-based data processing apparatus according to an embodiment of the present application.

Corresponding to the method embodiment, referring to FIG. 4, an embodiment of the present application further provides a dynamic white box-based data processing apparatus, including:

an obtaining module 401 configured for obtaining to-be-processed data and a redundant key; wherein, the to-be-processed data is to-be-encrypted data or to-be-decrypted data; the redundant key is obtained by mapping an original key using a pre-generated key obfuscation mapping relationship set;

an input module 402 configured for inputting the to-be-processed data and the redundant key into a white box algorithm library;

a first mapping module 403 configured for mapping the to-be-processed data using an encoding mapping relationship set in the white box algorithm library to obtain target encoded data; and a second mapping module 404 configured for mapping the target encoded data and the redundant key using a transformation mapping relationship set in the white box algorithm library to obtain processed data; wherein, if the to-be-processed data is to-be-encrypted data, then the processed data is encrypted data, and if the to-be-processed data is to-be-decrypted data, then the processed data is decrypted data.

As an implementation, the key obfuscation mapping relationship set comprises at least one key obfuscation mapping relationship; the apparatus further comprises:

a first generating module (not shown in the figure) configured for: for each obtained first-type key, dividing the first-type key into a first part key and a second part key; calling a cryptology obfuscation algorithm for obfuscating the first part key to obtain first transformed data and obfuscating the second part key to obtain second transformed data; splicing the first transformed data and the second transformed data to obtain a second-type key; and generating a mapping relationship between the first-type key and the second-type key as the key obfuscation mapping relationship.

As an implementation, the encoding mapping relationship set comprises at least one encoding mapping relationship, and the transformation mapping relationship set comprises at least one transformation mapping relationship; the apparatus further comprises: a second generating module and a third generating module (not shown in figures), wherein, the second generating module is configured for encoding each obtained first-type data using an encoding mapping algorithm to obtain encoded data; and generating a mapping relationship between the first-type data and the encoded data as the encoding mapping relationship; and the third generating module is configured for transforming each obtained second-type data and each second-type key using encryption and decryption transformation algorithm to obtain transformed data; generating a mapping relationship between the second-type data together with the second-type key and the transformed data as the transformation mapping relationship, and obtaining the white box algorithm library comprising the encoding mapping relationship set and the transformation mapping relationship set.

As an implementation, the second generating module is specifically configured for:

dividing the first-type data into first part data and second part data;

encoding the first part data using the encoding mapping algorithm to obtain first encoded data and encoding the second part data using the encoding mapping algorithm to obtain second encoded data; and splicing the first encoded data and the second encoded data to obtain encoded data for the first-type data.

As an implementation, the third generating module is specifically configured for:

inversely encoding the second-type data to obtain inverse encoded data; inversely obfuscating the second-type key to obtain an inverse obfuscated key; performing inverse transformation of row transformation on the inverse encoded data and the inverse obfuscated key to obtain first-type transformed data; and generating a mapping between the second-type data together with the second-type key and the first-type transformed data as a first-type transformation mapping relationship;

performing row transformation on the second-type data to obtain row transformed data; performing a first-type S-box transformation on the row transformed data to obtain first-type S-box transformed data; performing column transformation on the first-type S-box transformed data to obtain second-type transformed data; and generating a mapping relationship between the second-type data and the second-type transformed data as a second-type transformation mapping relationship;

performing a second-type S-box transformation on the second-type data to obtain second-type S-box transformed data; generating a mapping relationship between the second-type data and the second-type S-box transformed data as a third type transformation mapping relationship; and performing a key transformation on the second-type data and the second-type key to obtain third transformed data; determining a mapping relationship between the second-type data together with the second-type key and the third type transformed data as a fourth type transformation mapping.

As an implementation, the transformation mapping relationship set comprises a first-type transformation mapping relationship set, a second-type transformation mapping relationship set, a third type transformation mapping relationship set, and a fourth type transformation mapping relationship set, wherein, the first-type transformation mapping relationship set comprises at least one first-type transformation mapping relationship, the second-type transformation mapping relationship set comprises at least one second-type transformation mapping relationship, the third type transformation mapping relationship set comprises at least one third type transformation mapping relationship, and the fourth type transformation mapping relationship set comprises at least one fourth type transformation mapping relationship; and the second mapping module is further configured for:

mapping the target encoded data and the redundant key using the first-type transformation mapping relationship set to obtain the first-type mapping data;

mapping the first-type mapping data using the second-type transformation mapping relationship set to obtain the second mapping data;

mapping the second-type mapping data using the third type transformation mapping relationship set to obtain the third type mapping data; and mapping the third type mapping data using the fourth type transformation mapping relationship set to obtain processed data.

As an implementation, the second mapping module 404 is specifically configured for: mapping the first-type mapping data using the second-type transformation mapping relationship set to obtain intermediate data;

determining whether a preset cycle number is reached;

if the preset cycle number is not reached, then returning the second-type mapping data to the step of mapping the encoded data and the redundant key using the first-type transformation mapping relationship set to obtain the first-type mapping data, until the preset cycle number is reached; and if the preset cycle number is reached, then the intermediate data is determined as the second-type mapping data.

As an implementation, the third generating module is specifically configured for:

performing one or more of following transformations on the second-type data and the second-type key using the encryption and decryption transformation algorithm to obtain the transformed data: row transformation, S-box transformation, and column transformation.

By applying the embodiment of the present application, the pre-generated key obfuscation mapping relationship set is used for obfuscating the original key to obtain the redundant key, the redundant key and to-be-processed data are input into the white box algorithm library to be encrypted and decrypted. It can be seen, in the technical solution in the embodiment of the present application, when white box cryptography is used to encrypt and decrypt data, if a key in the white box algorithm library is to be changed, different redundant keys can be inputted into the white box algorithm library, i.e., changing the redundant keys inputted into the white box algorithm library without changing the white box algorithm library with the key. The flexibility of the solution for encrypting data is improved.

Figure 5:
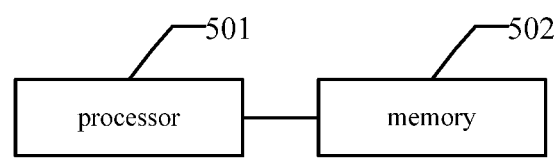
FIG. 5 is a schematic flowchart of an electronic device according to an embodiment of the present application.

An embodiment of the present application further provides an electronic device, as shown in FIG. 5, including a processor 501 and a memory 502.

The memory 502 is configured for storing a computer program.

The processor 501 is configured for executing the program stored on the memory 502 to perform any one of the dynamic white box-based data processing methods described above.

The memory in the electronic device may include a Random Access Memory (RAM), or a Non-volatile Memory (NVM), for example, at least one magnetic disk memory. Optionally, the memory may also be at least one storage device located away from the processor.

The processor may be a general-purpose processor, including a Central Processing Unit (CPU), a Network Processor (NP), etc; it may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

An embodiment of the present application further provides a computer-readable storage medium. The computer-readable storage medium stores a computer program which, when executed by a processor, causes the processor to perform any one of the dynamic white box-based data processing methods described above.

An embodiment of the present application further provides a computer program which, upon executed by a processor, causes the processor to perform any one of the dynamic white box-based data processing methods described above.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise (s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus, the embodiment of the device, the embodiment of the computer-readable storage medium are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A dynamic white box-based data processing method, comprising:
   obtaining to-be-processed data and a redundant key; wherein, the to-be-processed data is to-be-encrypted data or to-be-decrypted data; the redundant key is obtained by mapping an original key using a pre-generated key obfuscation mapping relationship set;
   inputting the to-be-processed data and the redundant key into a white box algorithm library, and mapping the to-be-processed data using an encoding mapping relationship set in the white box algorithm library to obtain target encoded data;
   mapping the target encoded data and the redundant key using a transformation mapping relationship set in the white box algorithm library to obtain processed data; wherein, if the to-be-processed data is to-be-encrypted data, then the processed data is encrypted data, and if the to-be-processed data is to-be-decrypted data, then the processed data is decrypted data,
   wherein, the encoding mapping relationship set comprises at least one encoding mapping relationship, and the transformation mapping relationship set comprises at least one transformation mapping relationship; before inputting the to-be-processed data and the redundant key into a white box algorithm library, the method further comprises:
   encoding each obtained first-type data using an encoding mapping algorithm to obtain encoded data; and generating a mapping relationship between the first-type data and the encoded data as the encoding mapping relationship;
   transforming each obtained second-type data and each second-type key using encryption and decryption transformation algorithm to obtain transformed data; generating a mapping relationship between the second-type data together with the second-type key and the transformed data as the transformation mapping relationship; and
   obtaining the white box algorithm library comprising the encoding mapping relationship set and the transformation mapping relationship set.

2. The method of claim 1, wherein, the key obfuscation mapping relationship set comprises at least one key obfuscation mapping relationship, which is generated by:
   for each obtained first-type key, dividing the first-type key into a first part key and a second part key; calling a cryptology obfuscation algorithm for obfuscating the first part key to obtain first transformed data and obfuscating the second part key to obtain second transformed data; splicing the first transformed data and the second transformed data to obtain a second-type key; and generating a mapping relationship between the first-type key and the second-type key as the key obfuscation mapping relationship.

3. The method of claim 1, wherein, encoding the first-type data using the encoding mapping algorithm to obtain encoded data comprises:
   dividing the first-type data into first part data and second part data;
   encoding the first part data using the encoding mapping algorithm to obtain first encoded data and encoding the second part data using the encoding mapping algorithm to obtain second encoded data; and
   splicing the first encoded data and the second encoded data to obtain encoded data for the first-type data.

4. The method of claim 1, wherein, transforming each obtained second-type data and each second-type key using encryption and decryption transformation algorithm to obtain transformed data; generating a mapping relationship between the second-type data together with the second-type key and the transformed data as the transformation mapping relationship comprises:
   inversely encoding the second-type data to obtain inverse encoded data; inversely obfuscating the second-type key to obtain an inverse obfuscated key; performing inverse transformation of row transformation on the inverse encoded data and the inverse obfuscated key to obtain first-type transformed data; and generating a mapping between the second-type data together with the second-type key and the first-type transformed data as a first-type transformation mapping relationship;
   performing row transformation on the second-type data to obtain row transformed data; performing a first-type S-box transformation on the row transformed data to obtain first-type S-box transformed data; performing column transformation on the first-type S-box transformed data to obtain second-type transformed data; and generating a mapping relationship between the second-type data and the second-type transformed data as a second-type transformation mapping relationship;
   performing a second-type S-box transformation on the second-type data to obtain second-type S-box transformed data; generating a mapping relationship between the second-type data and the second-type S-box transformed data as a third type transformation mapping relationship; and
   performing a key transformation on the second-type data and the second-type key to obtain third transformed data; determining a mapping relationship between the second-type data together with the second-type key and the third type transformed data as a fourth type transformation mapping.

5. The method of claim 4, wherein, the transformation mapping relationship set comprises a first-type transformation mapping relationship set, a second-type transformation mapping relationship set, a third type transformation mapping relationship set, and a fourth type transformation mapping relationship set, wherein, the first-type transformation mapping relationship set comprises at least one first-type transformation mapping relationship, the second-type transformation mapping relationship set comprises at least one second-type transformation mapping relationship, the third type transformation mapping relationship set comprises at least one third type transformation mapping relationship, and the fourth type transformation mapping relationship set comprises at least one fourth type transformation mapping relationship;

mapping the target encoded data and the redundant key using the transformation mapping relationship set in the white box algorithm library to obtain processed data comprises:

mapping the target encoded data and the redundant key using the first-type transformation mapping relationship set to obtain the first-type mapping data;

mapping the first-type mapping data using the second-type transformation mapping relationship set to obtain the second mapping data;

mapping the second-type mapping data using the third type transformation mapping relationship set to obtain the third type mapping data; and mapping the third type mapping data using the fourth type transformation mapping relationship set to obtain processed data.

6. The method of claim 5, wherein, mapping the first-type mapping data using the second-type transformation mapping relationship set to obtain the second mapping data comprises:

mapping the first-type mapping data using the second-type transformation mapping relationship set to obtain intermediate data;

determining whether a preset cycle number is reached;

if the preset cycle number is not reached, then returning the second-type mapping data to the step of mapping the encoded data and the redundant key using the first-type transformation mapping relationship set to obtain the first-type mapping data, until the preset cycle number is reached; and if the preset cycle number is reached, then the intermediate data is determined as the second-type mapping data.

7. The method of claim 1 wherein, transforming the second-type data and the second-type key using encryption and decryption transformation algorithm to obtain transformed data comprises:

performing one or more of following transformations on the second-type data and the second-type key using the encryption and decryption transformation algorithm to obtain the transformed data: row transformation, S-box transformation, and column transformation.

8. An electronic device, comprising a processor and a memory:

the memory is configured for storing a computer program;

the processor is configured for executing the program stored on the memory to perform the method of claim 1.

9. A non-transitory computer-readable storage medium having a computer program stored thereon which, when executed by a processor, causes the processor to perform the method of claim 1.

10. A dynamic white box-based data processing apparatus, comprising:

an obtaining module configured for obtaining to-be-processed data and a redundant key; wherein, the to-be-processed data is to-be-encrypted data or to-be-decrypted data; the redundant key is obtained by mapping an original key using a pre-generated key obfuscation mapping relationship set;

an input module configured for inputting the to-be-processed data and the redundant key into a white box algorithm library;

a first mapping module configured for mapping the to-be-processed data using an encoding mapping relationship set in the white box algorithm library to obtain target encoded data;

a second mapping module configured for mapping the target encoded data and the redundant key using a transformation mapping relationship set in the white box algorithm library to obtain processed data; wherein, if the to-be-processed data is to-be-encrypted data, then the processed data is encrypted data, and if the to-be-processed data is to-be-decrypted data, then the processed data is decrypted data, wherein, the encoding mapping relationship set comprises at least one encoding mapping relationship, and the transformation mapping relationship set comprises at least one transformation mapping relationship; the apparatus further comprises:

a second generating module configured for encoding each obtained first-type data using an encoding mapping algorithm to obtain encoded data; and generating a mapping relationship between the first-type data and the encoded data as the encoding mapping relationship; and a third generating module configured for transforming each obtained second-type data and each second-type key using encryption and decryption transformation algorithm to obtain transformed data; generating a mapping relationship between the second-type data together with the second-type key and the transformed data as the transformation mapping relationship, and obtaining the white box algorithm library comprising the encoding mapping relationship set and the transformation mapping relationship set.

11. The apparatus of claim 10, wherein, the key obfuscation mapping relationship set comprises at least one key obfuscation mapping relationship; the apparatus further comprises:

a first generating module configured for: for each obtained first-type key, dividing the first-type key into a first part key and a second part key; calling a cryptology obfuscation algorithm for obfuscating the first part key to obtain first transformed data and obfuscating the second part key to obtain second transformed data; splicing the first transformed data and the second transformed data to obtain a second-type key; and generating a mapping relationship between the first-type key and the second-type key as the key obfuscation mapping relationship.

12. The apparatus of claim 10, wherein, the second generating module is further configured for:

dividing the first-type data into first part data and second part data;

encoding the first part data using the encoding mapping algorithm to obtain first encoded data and encoding the second part data using the encoding mapping algorithm to obtain second encoded data; and splicing the first encoded data and the second encoded data to obtain encoded data for the first-type data.

13. The apparatus of claim 10, wherein, the third generating module is further configured for:

inversely encoding the second-type data to obtain inverse encoded data; inversely obfuscating the second-type key to obtain an inverse obfuscated key; performing inverse transformation of row transformation on the inverse encoded data and the inverse obfuscated key to obtain first-type transformed data; and generating a mapping between the second-type data together with the second-type key and the first-type transformed data as a first-type transformation mapping relationship;

performing row transformation on the second-type data to obtain row transformed data;

performing a first-type S-box transformation on the row transformed data to obtain first-type S-box transformed data; performing column transformation on the first-type S-box transformed data to obtain second-type transformed data; and generating a mapping relationship between the second-type data and the second-type transformed data as a second-type transformation mapping relationship;

performing a second-type S-box transformation on the second-type data to obtain second-type S-box transformed data; generating a mapping relationship between the second-type data and the second-type S-box transformed data as a third type transformation mapping relationship; and performing a key transformation on the second-type data and the second-type key to obtain third transformed data; determining a mapping relationship between the second-type data together with the second-type key and the third type transformed data as a fourth type transformation mapping.

14. The apparatus of claim 13, wherein, the transformation mapping relationship set comprises a first-type transformation mapping relationship set, a second-type transformation mapping relationship set, a third type transformation mapping relationship set, and a fourth type transformation mapping relationship set, wherein, the first-type transformation mapping relationship set comprises at least one first-type transformation mapping relationship, the second-type transformation mapping relationship set comprises at least one second-type transformation mapping relationship, the third type transformation mapping relationship set comprises at least one third type transformation mapping relationship, and the fourth type transformation mapping relationship set comprises at least one fourth type transformation mapping relationship;

and the second mapping module is further configured for:

mapping the target encoded data and the redundant key using the first-type transformation mapping relationship set to obtain the first-type mapping data;

mapping the first-type mapping data using the second-type transformation mapping relationship set to obtain the second mapping data;

mapping the second-type mapping data using the third type transformation mapping relationship set to obtain the third type mapping data; and mapping the third type mapping data using the fourth type transformation mapping relationship set to obtain processed data.

15. The apparatus of claim 14, wherein, the second mapping module is further configured for:

mapping the first-type mapping data using the second-type transformation mapping relationship set to obtain intermediate data;

determining whether a preset cycle number is reached;

if the preset cycle number is not reached, then returning the second-type mapping data to the step of mapping the encoded data and the redundant key using the first-type transformation mapping relationship set to obtain the first-type mapping data, until the preset cycle number is reached; and if the preset cycle number is reached, then the intermediate data is determined as the second-type mapping data.

16. The apparatus of claim 10, wherein, the third generating module is further configured for:

performing one or more of following transformations on the second-type data and the second-type key using the encryption and decryption transformation algorithm to obtain the transformed data: row transformation, S-box transformation, and column transformation.

* * * * *